(12) United States Patent
Nunami et al.

(10) Patent No.: US 8,605,565 B2
(45) Date of Patent: Dec. 10, 2013

(54) INFORMATION PROCESSING APPARATUS AND OPERATION CONTROL METHOD OF AN INFORMATION PROCESSING APPARATUS

(75) Inventors: Tsukasa Nunami, Ome (JP); Hideaki Andou, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 72 days.

(21) Appl. No.: 13/101,733

(22) Filed: May 5, 2011

(65) Prior Publication Data

US 2012/0057444 A1 Mar. 8, 2012

(30) Foreign Application Priority Data

Sep. 7, 2010 (JP) ................. 2010-200214

(51) Int. Cl.
*G11B 3/08* (2006.01)
(52) U.S. Cl.
USPC .......................... 369/230; 713/323
(58) Field of Classification Search
USPC ................. 713/1, 2, 100
See application file for complete search history.

(56) References Cited

U.S. PATENT DOCUMENTS

| | | | |
|---|---|---|---|
| 7,023,642 B2 * | 4/2006 | Suzuki et al. | 360/71 |
| 7,116,507 B2 * | 10/2006 | Suzuki et al. | 360/71 |
| 7,511,911 B2 * | 3/2009 | Suzuki et al. | 360/71 |
| 7,673,159 B2 | 3/2010 | Aoyagi et al. | |
| 7,929,383 B2 | 4/2011 | Yamazaki et al. | |
| 2005/0166078 A1 | 7/2005 | Taniguchi et al. | |
| 2005/0246561 A1 | 11/2005 | Wu et al. | |
| 2006/0020891 A1 | 1/2006 | Obara et al. | |
| 2006/0187708 A1 | 8/2006 | Aoyagi et al. | |
| 2007/0025195 A1 | 2/2007 | Oh et al. | |
| 2009/0199222 A1 | 8/2009 | Yamazaki et al. | |
| 2010/0106986 A1 | 4/2010 | Aoyagi et al. | |

FOREIGN PATENT DOCUMENTS

| | | |
|---|---|---|
| JP | 64-59413 | 3/1989 |
| JP | 2005-208966 | 8/2005 |
| JP | 2005-228335 | 8/2005 |
| JP | 2005-346420 | 12/2005 |
| JP | 2006-31625 | 2/2006 |

(Continued)

OTHER PUBLICATIONS

Japanese Patent Application No. 2011-247656, First Office Action, mailed Jan. 29, 2013, (with English Translation).

(Continued)

*Primary Examiner* — Joseph Feild
*Assistant Examiner* — Parul Gupta
(74) *Attorney, Agent, or Firm* — Blakely, Sokoloff, Taylor & Zafman LLP

(57) ABSTRACT

According to one embodiment, an information processing apparatus includes an optical disc drive, a data processing module which executes data processing using the optical disc drive, and a power supply management module which manages supply of power to the optical disc drive. The data processing module interrogates the power supply management module about the optical disc drive at the time of activation, and waits until an operating system recognizes the optical disc drive when an instruction is received from the power supply management module in response to an interrogation. The instruction instructs to wait until the operating system recognizes the optical disc drive. The power supply management module shifts the optical disc drive to a power supply on state and returns the instruction to the data processing module, if the optical disc drive is in a power supply off state when the interrogation is received.

10 Claims, 5 Drawing Sheets

(56) References Cited

FOREIGN PATENT DOCUMENTS

| | | |
|---|---|---|
| JP | 2006-172325 | 6/2006 |
| JP | 2007-35044 | 2/2007 |
| JP | 2007-323410 | 12/2007 |
| JP | 2009-187606 | 8/2009 |

OTHER PUBLICATIONS

Japanese Patent Application No. 2010-200214; Notice of Reasons for Rejection; Mailed Aug. 2, 2011 (with English translation).

* cited by examiner

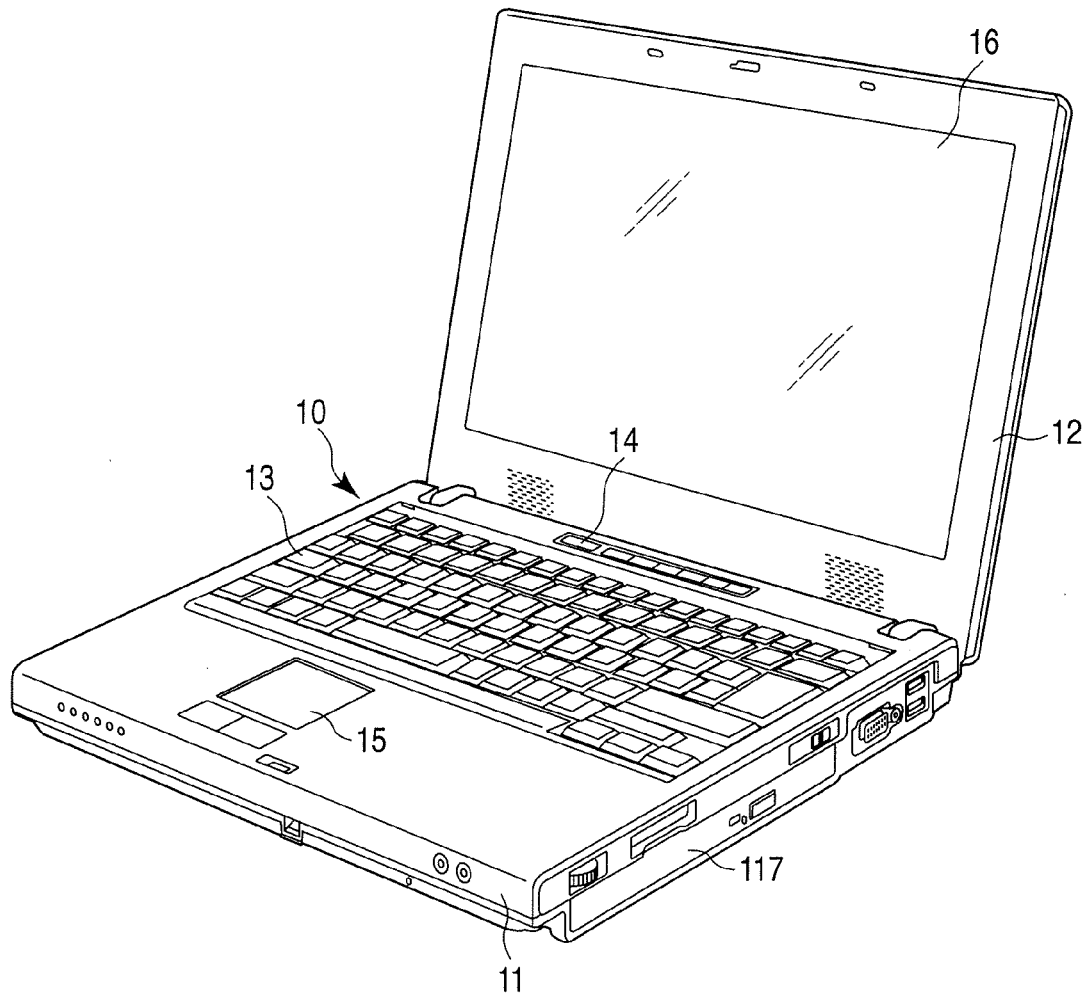
F I G. 1

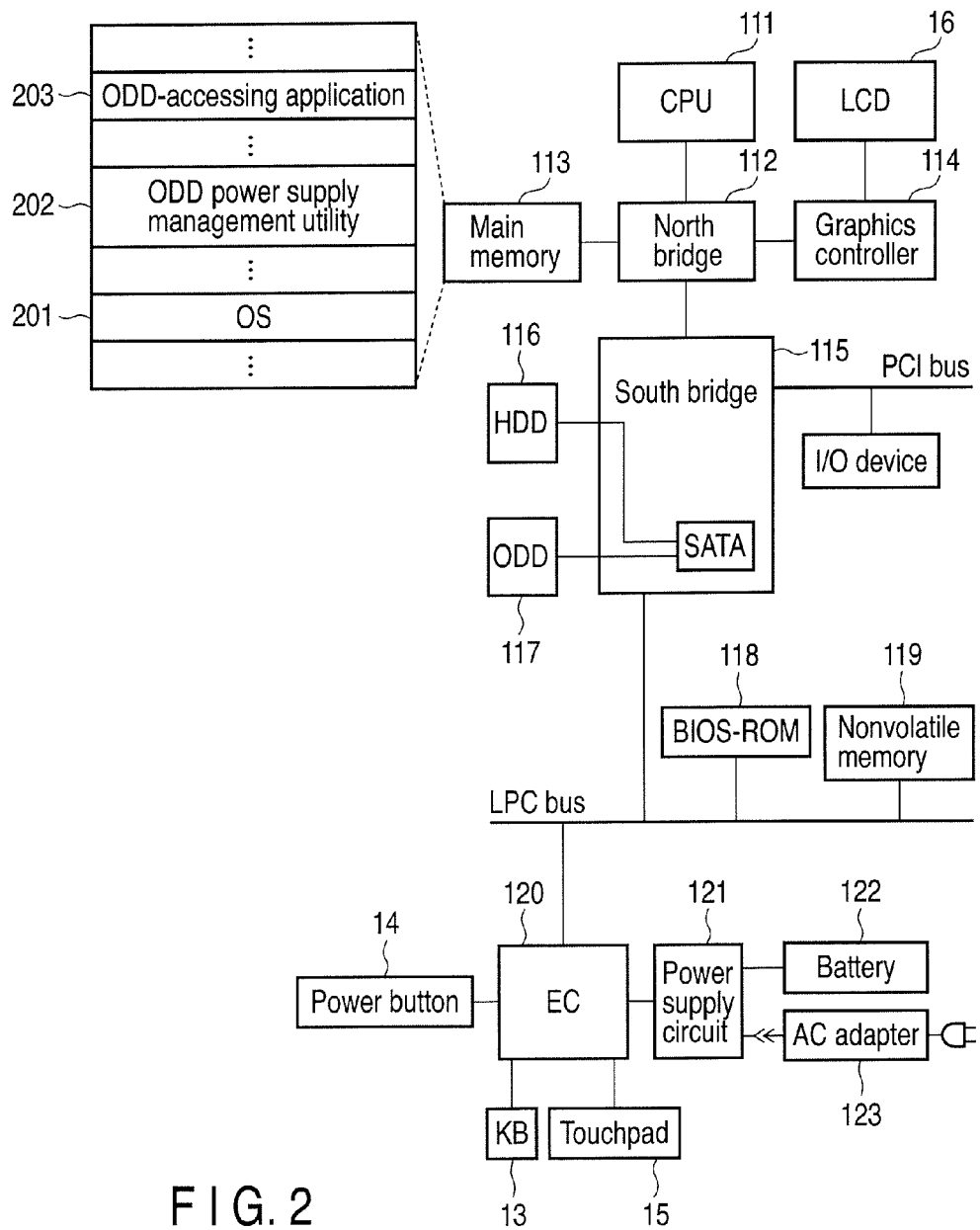
F I G. 2

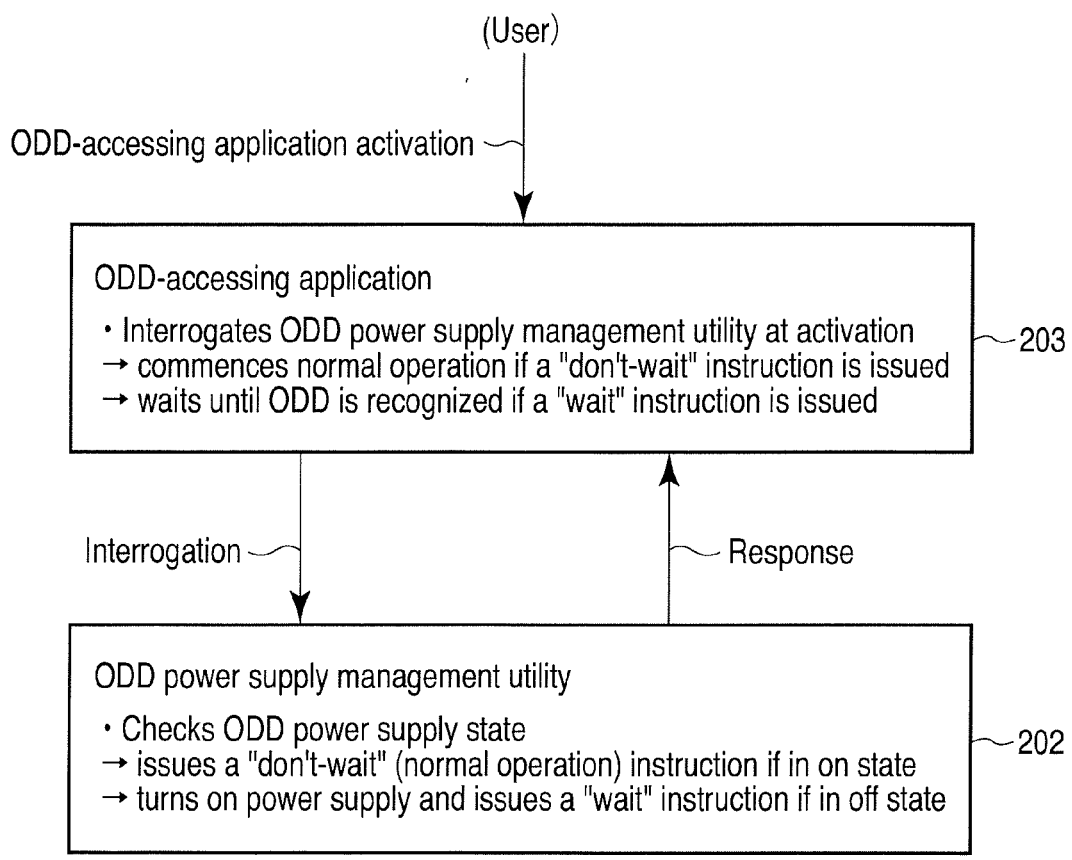
F I G. 3

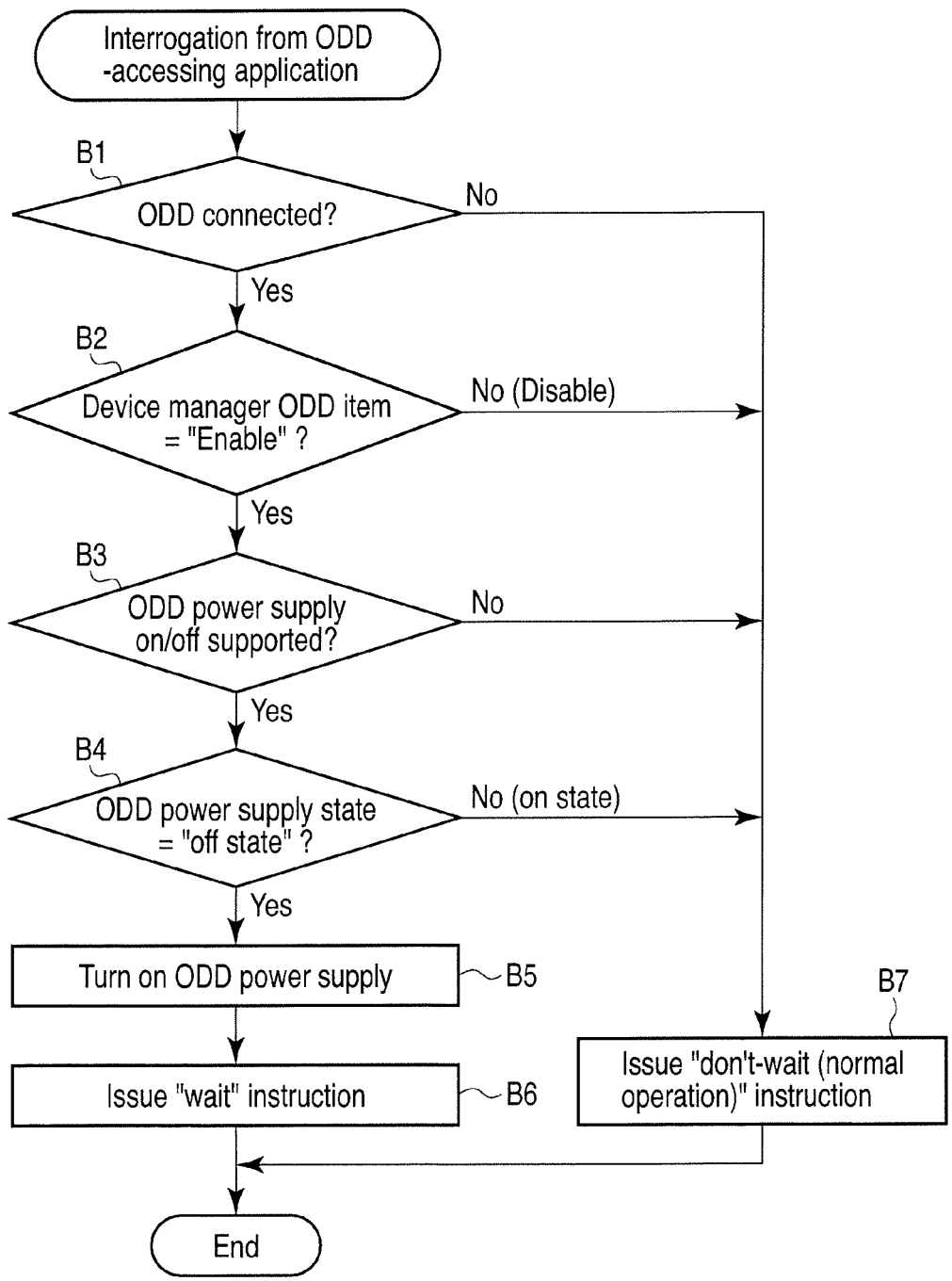
F I G. 5

INFORMATION PROCESSING APPARATUS AND OPERATION CONTROL METHOD OF AN INFORMATION PROCESSING APPARATUS

CROSS-REFERENCE TO RELATED APPLICATIONS

This application is based upon and claims the benefit of priority from Japanese Patent Application No. 2010-200214, filed Sep. 7, 2010; the entire contents of which are incorporated herein by reference.

FIELD

Embodiments described herein relate generally to operation control techniques suitable for a personal computer or the like equipped with, for example, an optical disc drive.

BACKGROUND

In recent years, portable, battery-powered, notebook personal computers has been widely used. Many such computers are equipped with a hard disc drive (HDD) and an optical disc drive (ODD) as storage devices.

In this type of computer developed and manufactured on the assumption that the computer is used on the move or outside the house, that is, the computer is powered by battery, possible continuous operating time is very important in running the computer with the battery. Therefore, this type of computer includes various power-saving functions.

For example, one proposed mechanism is capable of intentionally disconnecting various devices, including an optical disc drive, from the system configuration of a computer by a simple operation on the computer without physically disconnecting the various devices from the computer. The user of a computer with this mechanism can bring various devices, including an optical disc drive, into a power supply off state as needed.

Here, for example, suppose, when an optical disc drive is in the power supply off state, the user tries to use an application program that uses the optical disc drive. In this case, the user operates to cause the optical disc drive to return to a power supply on state before activating the application program.

However, it is likely that the user will forget bringing the optical disc drive into the power supply off state. It is undesirable to cause the user to determine whether the application program needs an optical disc drive each time the application program is activated.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is an exemplary perspective view showing an external appearance of an information processing apparatus according to an embodiment.

FIG. 2 is an exemplary block diagram showing a system configuration of the information processing apparatus according to the embodiment.

FIG. 3 is an exemplary conceptual diagram to explain an operating principle when an application program using an optical disc drive is activated on the information processing apparatus of the embodiment.

FIG. 5 is an exemplary flowchart showing an operating procedure, which is related to an ODD, of an ODD power supply management utility program running on the information processing apparatus.

DETAILED DESCRIPTION

Figure 4:
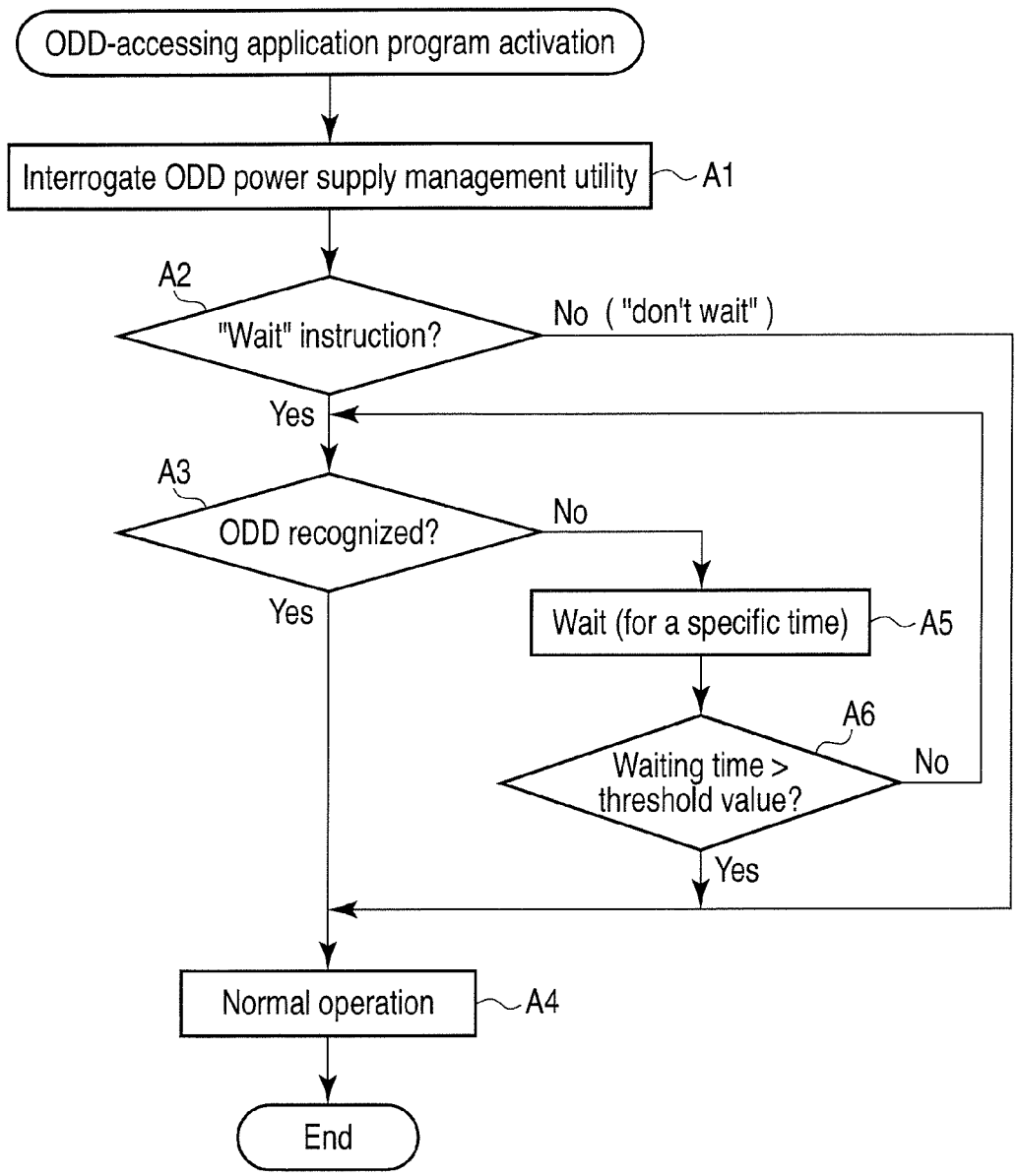
FIG. 4 is an exemplary flowchart showing an operating procedure, which is related to an ODD, of an ODD-accessing application program running on the information processing apparatus of the embodiment.

Various embodiments will be described hereinafter with reference to the accompanying drawings.

In general, according to one embodiment, an information processing apparatus includes an optical disc drive, a data processing module and a power supply management module. The data processing module is configured to execute data processing using the optical disc drive. The power supply management module is configured to manage supply of power to the optical disc drive. The data processing module includes an interrogation module and a waiting module. The interrogation module is configured to interrogate the power supply management module about the optical disc drive at the time of activation. The waiting module is configured to wait until an operating system recognizes the optical disc drive when an instruction is received from the power supply management module in response to an interrogation by the interrogation module. The instruction instructs to wait until the operating system recognizes the optical disc drive. The power supply management module includes a controller. The controller is configured to shift the optical disc drive to a power supply on state and to return the instruction to the data processing module, if the optical disc drive is in a power supply off state when the power supply management module receives the interrogation from the data processing module.

First, the configuration of an information processing apparatus according to an embodiment will be explained with reference to FIG. 1. The information processing apparatus is realized by, for example, a battery-powered, notebook computer 10.

FIG. 1 is an exemplary perspective view of the computer 10 with a display unit opened, seen from the front. The computer 10 includes a computer body 11 and a display unit 12. A liquid-crystal display (LCD) 16 is incorporated in the display unit 12.

The display unit 12 is supported by the computer body 11. The display unit 12 is mounted on the computer body 11 so as to be capable of turning freely between an open position where the top of the computer body 11 is exposed and a closed position where the top of the computer body 11 is covered with the display unit 12. The computer body 11 has a thin box chassis. On the top face of the computer body 11, there are provided a keyboard 13, a power button 14 for turning on or off the computer 10, a touchpad 15, and others. In the computer body 11, there is provided an optical disc drive 117 for driving an optical disc medium.

FIG. 2 shows a system configuration of the computer 10.

As shown in FIG. 2, the computer 10 includes a CPU 111, a north bridge 112, a main memory 113, a graphics controller 114, a south bridge 115, a hard disk drive (HDD) 116, an optical disc drive (ODD) 117, a BIOS-ROM 118, a nonvolatile memory 119, an embedded controller (EC) 120, and a power supply circuit 121.

The CPU 111 is a processor that controls the operation of each component of the computer 10. The CPU 111 executes various pieces of software loaded from the HDD 116 or ODD 117 to the main memory 113. The various pieces of software include an operating system (OS) 201 that supervises resource management and an ODD power supply management utility program 202 (power management module) and an ODD-accessing application program 203 (data processing module) which operate under control of the OS 201. In addition, the CPU 111 also executes a Basic Input/Output System (BIOS) stored in the BIOS-ROM 118. The BIOS is a program for hardware control.

The north bridge 112 is a bridge device that connects a local bus of the CPU 111 and the south bridge 115. The north bridge 112 includes the function of communicating with the graphics controller 114. The north bridge 112 includes a memory controller that controls the main memory 113.

The graphics controller 114 is a display controller that controls the LCD 16 used as a display monitor of the computer 10. The south bridge 115 is connected to a Peripheral Component Interconnect (PCI) bus and to a Low Pin Count (LPC) bus. The south bridge 115 includes a serial ATA (SATA) controller for controlling the HDD 116 or ODD 117. Each of the HDD 116 and ODD 117 is connected via a SATA bus to the south bridge 115.

The EC 120, in cooperation with the power supply circuit 121, turns the computer 10 on or off according to the operation of the power button 14 by the user. The EC 120 includes a keyboard controller for controlling data input by the operation of the keyboard 13 or touchpad 15. The power supply circuit 121 generates a system power supply to be supplied to each component of the computer 10 by using a battery 122 included in the computer body 11 or an external power supply supplied via an AC adapter 123.

Here, the operating principle when an application program using the ODD 117 is activated on the computer 10 will be explained with reference to FIG. 3.

The ODD-accessing application program 203 is a program to perform data processing with the ODD 117. The ODD-accessing application program 203 is a general name for programs that follow the procedure for operating in cooperation with the ODD power supply management utility program 202. One example of the ODD-accessing application program 203 is a writing software program that writes various items of data to optical disc media housed in the ODD 117.

The computer 10 includes a mechanism for being capable of intentionally disconnecting the ODD 117 from the system configuration of the computer 10 when, for example, a specific key is operated on the keyboard 13. That is, when the ODD-accessing application program 203, such as a writing software program, is activated, it is conceivable that the ODD 117 has been brought into the power supply off state. The mechanism for disconnecting the ODD 117 from the system configuration of the computer 10, that is, the mechanism for bringing the ODD 117 into the power supply off state, is not limited to a mechanism that operates in response to the user's explicit instruction to operate a specific key on the keyboard 13. For example, the mechanism may be such that the ODD 117 is brought into the power supply off state automatically under a specific condition, such as when a state where an optical disc medium has not been installed in the ODD 117 has lasted longer than a specific period in a battery-powered operation.

The ODD-accessing application program 203 activated by the user interrogates the ODD power supply management utility program 202. Having received the interrogation, the ODD power supply management utility program 202 issues a specific command to, for example, the BIOS, thereby acquiring the power supply state of the ODD 117. If the ODD 117 is in the power supply on state, the ODD power supply management utility program 202 returns a "don't-wait" instruction to the ODD-accessing application program 203 in response to the interrogation.

When having received the "don't-wait" instruction, the ODD-accessing application program 203 commences normal operation (similar to an existing program that does not have the procedure for operating in cooperation with the ODD power supply management utility program 202). It is when the ODD 117 is in the power supply on state that the ODD 117 has received the "don't-wait" instruction. Therefore, the activation of the ODD-accessing application program 203 has been completed without any problem and data is written to the ODD 117.

On the other hand, when the ODD 117 is in the power supply off state, firstly, the ODD power supply management utility program 202 returns a "wait" instruction to the ODD-accessing application program 203 in response to the interrogation. Secondly, the ODD power supply management utility program 202 issues an instruction to cause the ODD 117 to return to the power supply on state to the EC 120 (via the BIOS).

Having received the instruction, the EC 120 causes the power supply circuit 121 to supply power to the ODD 117 and generates an interrupt to incorporate the ODD 117 into the system configuration of the computer 10. This interrupt causes the OS 201 (supervising resource management) to recognize the existence of the ODD 117 as if the ODD 117 were added.

In addition, having received the "wait" instruction, the ODD-accessing application program 203 waits until the ODD 117 is recognized by the OS 201 before commencing normal operation. Then, after the ODD 117 has been recognized by the OS 201, the ODD-accessing application program 203 commences normal operation.

It is when the ODD 117 is in the power supply off state that the ODD 117 has received the "wait" instruction. In this case, originally, for example, the process of displaying a caution message of "ODD cannot be recognized" is supposed to be carried out as a part of normal operation (because the program is supposed to access the ODD). In contrast, in the computer 10, when the ODD 117 is in the power supply off state, even if the ODD-accessing application program 203 is activated, the ODD-accessing application program 203 cooperates with the ODD power supply management utility program 202 to cause the ODD 117 to return automatically to the power supply on state and the ODD-accessing application program 203 to be activated and operated without making the user feel any discomfort.

The ODD-accessing application program 203 issues a specific command to the OS 201, thereby acquiring data on whether the OS 201 has recognized the ODD 117. After having received the "wait" instruction from the ODD power supply management utility program 202, the ODD-accessing application program 203 issues the specific command to the OS 201 repeatedly at regular intervals until the program 203 has received the response that the OS 201 has recognized the ODD 117. When having received the response that the OS 201 has recognized the ODD 177, the ODD-accessing application program 203 commences normal operation.

If having failed to receive from the OS 201 the response that the OS 201 has recognized the ODD 117 even when a specific period has passed since the "wait" instruction was received, the ODD-accessing application program 203 does not wait any further and commences normal operation. In this case, the process of displaying a caution message of "ODD cannot be recognized" is carried out. The reason is, for example, to prevent the ODD-accessing application program 203 from being caused to remain in the wait state endlessly if the problem of being unable to cause the ODD 117 to return to the power supply on state because some failure has occurred.

When having received an interrogation from the ODD-accessing application program 203, if the ODD 117 is in the power supply off state, the ODD power supply management utility program 202 may return a "wait" instruction to the ODD-accessing application program 203 on condition that at least all the following items (1) to (3) are satisfied:

(1) ODD 117 is physically connected.
(2) ODD item of device manager of OS 201 is "Enable."
(3) Power supply on/off of ODD 117 is supported.

Even if one of items (1) to (3) is not satisfied, the ODD power supply management utility program 202 returns a "don't-wait" instruction to the ODD-accessing application program 203. A method of checking items (1) to (3) is not limited to a specific method and any conceivable method (regardless of whether it is well known or not) may be applied.

By doing this, for example, when the ODD power supply management utility program 202 is activated on a computer which has no ODD installed, the ODD power supply management utility program 202 is activated on a computer in which an ODD cannot be incorporated in the system configuration, or the ODD power supply management utility program 202 is activated on a computer which cannot switch dynamically between the on and off of power supply to the ODD and the ODD is in the power supply off state, the ODD-accessing application program 203 can be prevented from being caused to remain in the wait state endlessly.

FIG. 4 is an exemplary flowchart showing an operating procedure, which is related to the ODD 117, of the ODD-accessing application program 203 running on the computer 10.

When being activated, the ODD-accessing application program 203 interrogates the ODD power supply management utility program 202 (block A1). When having received a "wait" instruction from the ODD power supply management utility program 202 in response to the interrogation (YES in block A2), the ODD-accessing application program 203 checks whether the OS 201 has recognized the ODD 117 (block A3).

If the OS 201 has recognized the ODD 117 (YES in block A3), the ODD-accessing application program 203 commences normal operation at the time (block A4). On the other hand, if the OS 201 has not recognized the ODD 117 (NO in block A3), the ODD-accessing application program 203 waits for only a specific length of time (block A5).

The ODD-accessing application program 203 monitors whether the waiting time after the reception of the "wait" instruction has exceeded a predetermined threshold value (block A6). If the waiting time has not exceeded the threshold value (NO in block A6), the ODD-accessing application program 203 returns to block A3 and checks again whether the OS 201 has recognized the ODD 117. That is, the ODD-accessing application program 203 checks repeatedly whether the OS 201 has recognized the ODD 117 until the OS 201 has recognized the ODD 117 or the waiting time after the reception of the "wait" instruction (with the OS 201 being unable to recognize the ODD 117) has reached the threshold value.

Then, if the waiting time has exceeded the threshold value (YES in block A6), the ODD-accessing application program 203 does not wait any further and commences normal operation in block A4. In this case, for example, the operation of displaying a caution message of "ODD cannot be recognized" is carried out as a part of normal operation.

FIG. 5 is an exemplary flowchart showing an operating procedure, which is related to an ODD, of the ODD power supply management utility program 202 running on the computer 10.

When having received an interrogation from the ODD-accessing application program 203, the ODD power supply management utility program 202 checks whether the ODD 117 is physically connected to the computer 10 (block B1). If the ODD 117 is physically connected to the computer (YES in block B1), the ODD power supply management utility program 202 then checks whether the ODD item of the device manager of the OS 201 is "Enable" (block B2).

If the ODD item is "Enable" (YES in block B2), the ODD power supply management utility program 202 further checks whether the computer 10 supports the on/off of power supply to the ODD 117 (block B3). If the computer 10 supports the on/off of power supply to the ODD 117 (YES in block B3), the ODD power supply management utility program 202 checks the power supply state of the ODD 117 (block B4).

If the ODD 117 is in the power supply off state (YES in block B4), the ODD power supply management utility program 202 causes the ODD 117 to return to the power supply on state (block B5), and returns a "wait" instruction to the ODD-accessing application program 203 in response to the interrogation (block B6).

Furthermore, if the ODD 117 is not physically connected to the computer 10 (NO in block B1), if the ODD item of the device manager of the OS 201 is not "Enable" (or is "Disable") (NO in block B2), or if the computer 10 does not support the on/off of power supply to the ODD 117 (NO in block B3), the ODD power supply management utility program 202 returns a "don't-wait" instruction to the ODD-accessing application program 203 in response to the interrogation at the time when one of the above conditions is determined (block B7). In addition, if the ODD 117 is in the power supply on state (NO in block B4), the ODD power supply management utility program 202 returns a "don't-wait" instruction to the ODD-accessing application program 203 in response to the interrogation at the time (block B7).

As described above, in the computer 10, the ODD-accessing application program 203 and ODD power supply management utility program 202 cooperate with each other to cause the ODD 117 to automatically return to the power supply on state when the ODD-accessing application program 203 (using the ODD 117) is activated when the ODD 117 is in the power supply off state.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising:
an optical disc drive;
a data processing module configured to execute data processing using the optical disc drive; and
a power supply management module configured to manage supply of power to the optical disc drive, wherein:
the data processing module comprises:
an interrogation module configured to interrogate the power supply management module about the optical disc drive at the time of activation; and
a waiting module configured to wait until an operating system recognizes the optical disc drive when an instruction is received from the power supply management module in response to an interrogation by the interrogation module, the instruction instructing to wait until the operating system recognizes the optical disc drive, and
the power supply management module comprises a controller configured to shift the optical disc drive to a power supply on state and to return the instruction to the data processing module, if the optical disc drive is in a power supply off state when the power supply management module receives the interrogation from the data processing module.

2. The apparatus of claim 1, wherein the waiting module of the data processing module is configured to cause the data processing module to perform normal operation comprising a processing procedure in condition under which the operating system does not recognize the optical disc drive, if a state where the optical disc drive is not recognized continues longer than a predetermined period after the waiting module receives the instruction to wait until the optical disc drive is recognized.

3. The apparatus of claim 2, wherein the data processing module is configured to determine whether or not the optical disc drive is recognized by issuing a predetermined command to the operating system, the predetermined command being issued repeatedly at predetermined intervals until the optical disc drive is recognized.

4. The apparatus of claim 1, wherein:
the controller of the power supply management module is configured to return an instruction to perform normal operation to the data processing module when the optical disc drive is in a power supply on state; and
the waiting module of the data processing module is configured to cause the data processing module to perform the normal operation immediately when the second instruction is received from the power supply management module.

5. The apparatus of claim 1, wherein the controller of the power supply management module is configured to return the instruction to wait until the operating system recognizes the optical disc drive to the data processing module, if the optical disc drive is in a power supply off state when the power supply management module receives the interrogation from the data processing module, subject to satisfaction of a condition that the optical disc drive is physically connected, an item about the optical disc drive in a device manager of the operating system is set validly, and a function of turning on/off power supply to the optical disc drive is supported.

6. The apparatus of claim 5, wherein the controller of the power supply management module is configured to return the instruction to perform the normal operation comprising the processing procedure in condition under which the operating system does not recognize the optical disc drive to the data processing module, subject to failure of satisfaction of the condition that the optical disc drive is physically connected, an item about the optical disc drive in a device manager of the operating system is set validly, and a function of turning on/off power supply to the optical disc drive is supported.

7. The apparatus of claim 1, wherein the power supply management module is configured to recognize a state of power supply to the optical disc drive by issuing a predetermined command to a Basic Input/Output System (BIOS).

8. An operation control method of an information processing apparatus comprising an optical disc drive, the method comprising:
causing a data processing module, which executes data processing using the optical disc drive, to interrogate a power supply management module about the optical disc drive at the time of activation, the power supply management module managing supply of power to the optical disc drive;
waiting until an operating system recognizes the optical disc drive when an instruction is received from the power supply management module in response to an interrogation, the instruction instructing to wait until the operating system recognizes the optical disc drive; and
causing the power supply management module to shift the optical disc drive to a power supply on state and return the instruction to the data processing module, if the optical disc drive is in a power supply off state when the interrogation is received from the data processing module.

9. The method of claim 8, further comprising causing the data processing module to perform normal operation comprising a processing procedure in condition under which the operating system does not recognize the optical disc drive, if a state where the optical disc drive is not recognized continues longer than a predetermined period after the instruction is receive.

10. The method of claim 8, further comprising:
causing the power supply management module to return an instruction to perform normal operation to the data processing module when the optical disc drive is in a power supply on state; and
causing the data processing module to perform the normal operation immediately when the second instruction is received from the power supply management module.

* * * * *